US009156412B1

(12) United States Patent
Calvert

(10) Patent No.: US 9,156,412 B1
(45) Date of Patent: Oct. 13, 2015

(54) UPWARDLY EXTENSIBLE TRUCK TOOLBOX

(71) Applicant: UETT Associates, Trustee for Upwardly Extensible Truck Toolbox CRT Trust, Manassas, VA (US)

(72) Inventor: S. Mill Calvert, Manassas, VA (US)

(73) Assignee: UETT Associates, Trustee for Upwardly extensible truck toolbox CRT Trust, Manassas, VA (US)

( * ) Notice: Subject to any disclaimer, the term of this patent is extended or adjusted under 35 U.S.C. 154(b) by 44 days.

(21) Appl. No.: 14/298,618

(22) Filed: Jun. 6, 2014

(51) Int. Cl.
B60R 7/00 (2006.01)
B60R 9/00 (2006.01)
B60R 9/06 (2006.01)
B60P 7/08 (2006.01)

(52) U.S. Cl.
CPC . B60R 9/065 (2013.01); B60P 7/08 (2013.01); B60R 9/00 (2013.01); B60R 9/06 (2013.01)

(58) Field of Classification Search
CPC .......................................................... B60R 9/06
USPC .......... 224/404, 402, 403; 296/37.6; 414/462; 190/22; 220/8
See application file for complete search history.

(56) References Cited

U.S. PATENT DOCUMENTS

| 1,756,775 | A | * | 4/1930 | Frankland | 292/281 |
| 1,941,375 | A | * | 12/1933 | Wildman | 224/42.34 |
| 2,861,857 | A | * | 11/1958 | Lee et al. | 312/312 |
| 3,694,024 | A | * | 9/1972 | Linville | 296/26.05 |
| 5,088,636 | A | * | 2/1992 | Barajas | 224/281 |
| 5,299,722 | A | * | 4/1994 | Cheney | 224/404 |
| 5,303,969 | A | * | 4/1994 | Simnacher | 296/37.6 |
| 5,398,987 | A | * | 3/1995 | Sturgis | 296/37.6 |
| 5,598,961 | A | * | 2/1997 | Sills | 224/404 |
| 5,601,206 | A | * | 2/1997 | Haas et al. | 220/527 |
| 5,833,065 | A | * | 11/1998 | Burgess | 206/373 |
| 5,964,492 | A | * | 10/1999 | Lyon | 224/404 |
| 5,992,719 | A | * | 11/1999 | Carter, III | 224/404 |
| 6,126,220 | A | * | 10/2000 | Brasher | 296/26.04 |
| 6,244,502 | B1 | * | 6/2001 | Hollar et al. | 229/120.011 |
| 6,386,409 | B1 | * | 5/2002 | Cheney | 224/404 |
| 6,460,744 | B2 | * | 10/2002 | Lance et al. | 224/404 |
| 6,467,830 | B1 | * | 10/2002 | Cortright | 296/37.6 |
| 6,471,278 | B2 | * | 10/2002 | Leitner et al. | 296/37.6 |
| 6,554,169 | B1 | * | 4/2003 | Furlong | 224/404 |
| 6,626,479 | B1 | * | 9/2003 | Skoug | 296/37.6 |
| 7,017,966 | B2 | * | 3/2006 | Clonan | 296/37.6 |
| 7,182,177 | B1 | * | 2/2007 | Simnacher | 187/211 |
| 7,234,618 | B2 | | 6/2007 | Warganich | |
| 7,261,354 | B1 | * | 8/2007 | Lozano | 296/26.05 |
| 8,857,684 | B1 | * | 10/2014 | Calvert | 224/404 |

(Continued)

Primary Examiner — Justin Larson
Assistant Examiner — Lester L Vanterpool
(74) Attorney, Agent, or Firm — Louis Ventre, Jr.

(57) ABSTRACT

A toolbox for a truck bed has a box with at least five walls, including a floor and four side-walls rising vertically from the floor. The box has an open top-end. Extension walls fit within the box next to each of the vertical walls of the box. The extension walls are joined together. A cover is attached with a hinge affixed at the top of one of the extension walls and it rotates between a closed position and an open position. The closed position prevents access to the box and the open position enables access to the storage volume in the box. The extension walls are slidably engaged to the box in extensible guide rails so that the extension walls can be moved vertically from a lowered position to an elevated position and vice versa within the box.

4 Claims, 4 Drawing Sheets

(56) References Cited

U.S. PATENT DOCUMENTS

| | | | |
|---|---|---|---|
| 2002/0014505 A1* | 2/2002 | Lance et al. | 224/404 |
| 2004/0079777 A1* | 4/2004 | Schomaker et al. | 224/404 |
| 2005/0067474 A1* | 3/2005 | Wang | 229/117.35 |
| 2006/0102669 A1* | 5/2006 | Fouts et al. | 224/404 |
| 2009/0127305 A1* | 5/2009 | Ropp | 224/404 |
| 2010/0051662 A1* | 3/2010 | Hanson et al. | 224/404 |
| 2010/0212661 A1* | 8/2010 | Schwarze et al. | 126/705 |
| 2012/0200106 A1* | 8/2012 | Villano et al. | 296/37.6 |

\* cited by examiner

UPWARDLY EXTENSIBLE TRUCK TOOLBOX

TECHNICAL FIELD

In the field of package and article carriers securable to the bed of a truck, a toolbox is upwardly extensible to enlarge its storage capacity.

BACKGROUND ART

A toolbox is a container that may also be known as a toolkit, tool chest or workbox. The toolbox helps to organize, transport, and protect the owner's tools. Tools are a necessity for many craftsman and non-commercial hobbyists. The tools and contents of a toolbox vary as does the purpose sought to be filled by the owner.

One of the most important purposes in a commercial setting is the safety and security of a tradesman's tools. Without tools, the tradesman can no longer earn a living and provide for his or her family. Most working tradesmen that have a pickup truck usually have a conventional truck toolbox mounted in the bed of the truck.

Modern toolboxes are predominantly made of metal or plastic, but may also be made of wood. Diamond plate metal toolboxes are rugged and long lasting, typically made of steel, including stainless steel, and aluminum. When weight and elimination of rust is a goal, plastic toolboxes have found application. Wood toolboxes are typically a thing of the past, but are known to be used by those seeking to minimize costs and those desiring the distinctiveness of hardwoods.

SUMMARY OF INVENTION

A toolbox for a truck bed has a box with at least five walls, including a floor and four side-walls rising vertically from the floor. The box has an open top-end. Extension walls fit within the box next to each of the vertical walls of the box. The extension walls are joined together much like a cardboard box with its top and bottom flaps removed. A cover is attached with a hinge affixed at the top of one of the extension walls. The hinge enables the cover to rotate between a closed position and an open position. The closed position prevents access to the box and the open position enables access to the storage volume in the box. The extension walls are slidably engaged to the box in extensible guide rails so that the extension walls can be moved vertically from a lowered position to an elevated position and vice versa within the box.

The toolbox may include locking hinged pins that may be swiveled to pass through an extension wall and through a mating hole in a side-wall of the box. Alternatively, a spring-actuated detent automatically engages when the extension wall is raised to a level that the detent reaches an aligned hole in the box.

The toolbox may include a lift support that biases the position of the extension walls to the elevated position in order to minimize the effort required to lift the extension walls. Solving a similar purpose, the extension walls may be outfitted with one or more handles so as to be accessible when the cover is in the open position.

TECHNICAL PROBLEM

The problem with these conventional boxes always comes down to the issue of size. They can only be so big, because the bed space in the truck is also important for hauling materials and supplies. Because of this size dilemma, often times the needed tools for a job cannot be locked up because the toolbox just doesn't have enough capacity.

This is often the case when a new job is started and lots of tools need to be taken to the job site or when the job has been finished and all of the tools need to be brought home. Unfortunately, this has often resulted in many precious tools vanishing from a working man's truck in the blink of an eye. If only there were a way to double the size of a truck toolbox, when needed, without giving up any of the needed bed space.

SOLUTION TO PROBLEM

The solution to this has now been solved with the invention of the upwardly extensible truck toolbox. A hard working tradesman can now instantly double the size of his toolbox without losing any bed space at all. He or she can now completely protect his precious tool collection that he has worked so hard to acquire.

ADVANTAGEOUS EFFECTS OF INVENTION

The upwardly extensible truck toolbox works by having a lift-up portion of the toolbox that slides into the mounted stationary bottom box. In one embodiment, the workman can open the top of the toolbox and grab a lift handle to telescope and extend up the tip box, which can then be locked in place with hinged or spring-activated lock pens. When the top box is extended up and locked in place, this will at least double the space in the toolbox. When the workman no longer needs the big extended box, he can easily pull out the locking hinge pins and slide the top box back into the stationary bottom box.

This invention will help to protect the livelihood of the hardworking craftsman, and help to keep America's force of productivity on track.

BRIEF DESCRIPTION OF DRAWINGS

The drawings illustrate preferred embodiments of the upwardly extensible truck toolbox according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

Figure 1:
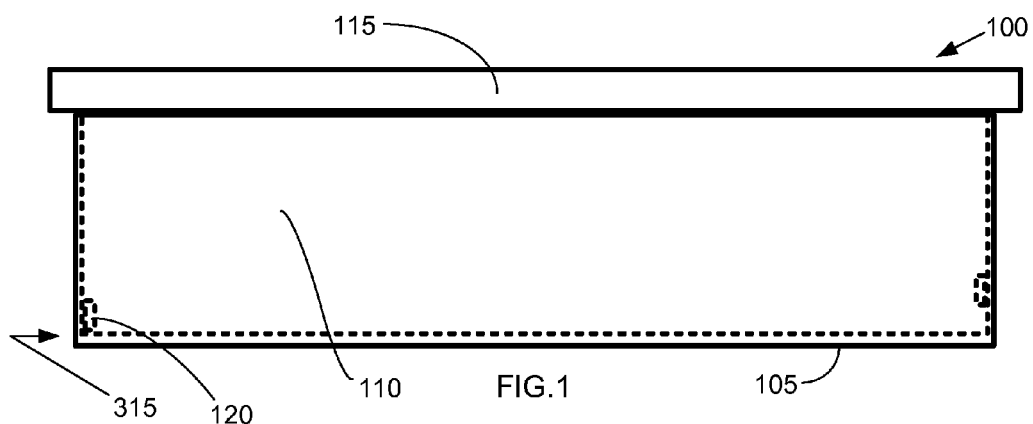
FIG. 1 is a front elevation view of an upwardly extensible truck toolbox with the extensible inner sidewalls in a fully withdrawn and stored state.
Figure 2:
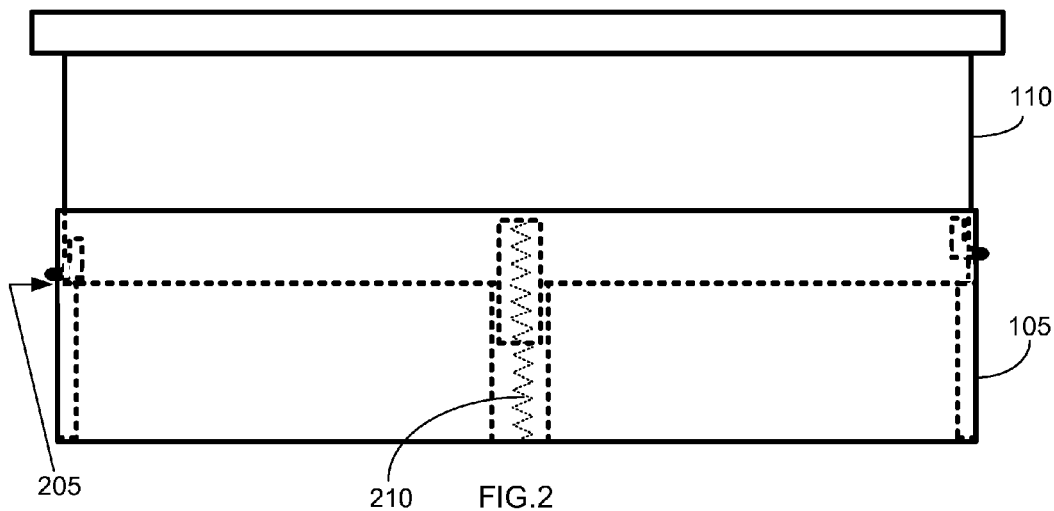
FIG. 2 is a front elevation view of an upwardly extensible truck toolbox with the extensible inner sidewalls in a fully extended position and including a spring that biases the extensible walls toward the fully extended position.
Figure 3:
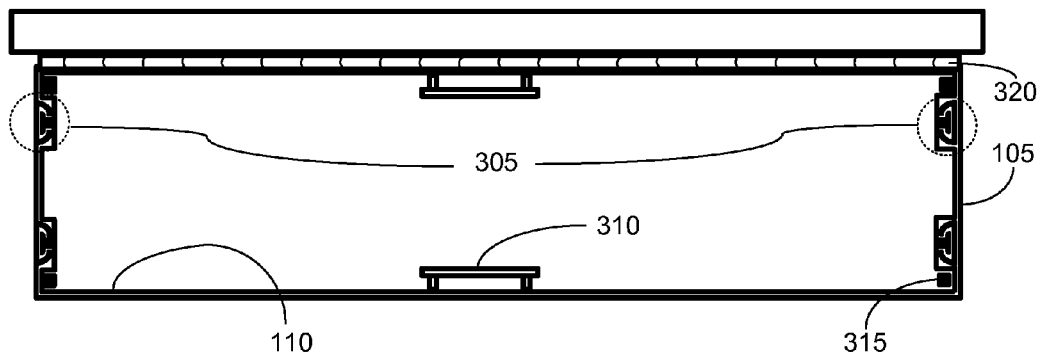
FIG. 3 is a top view of the upwardly extensible truck toolbox of FIG. 2 with the cover rotated up to show one implementation using four extensible guide rails and two handles mounted to the interior surface of the extension walls.
Figure 4:
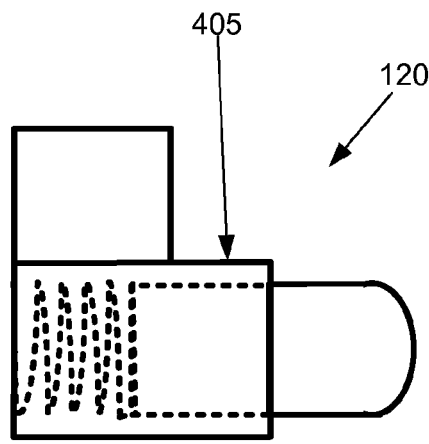
FIG. 4 is a side elevation view of a spring-actuated detent used to hold the extension walls of a preferred embodiment in a deployed position.
Figure 10:
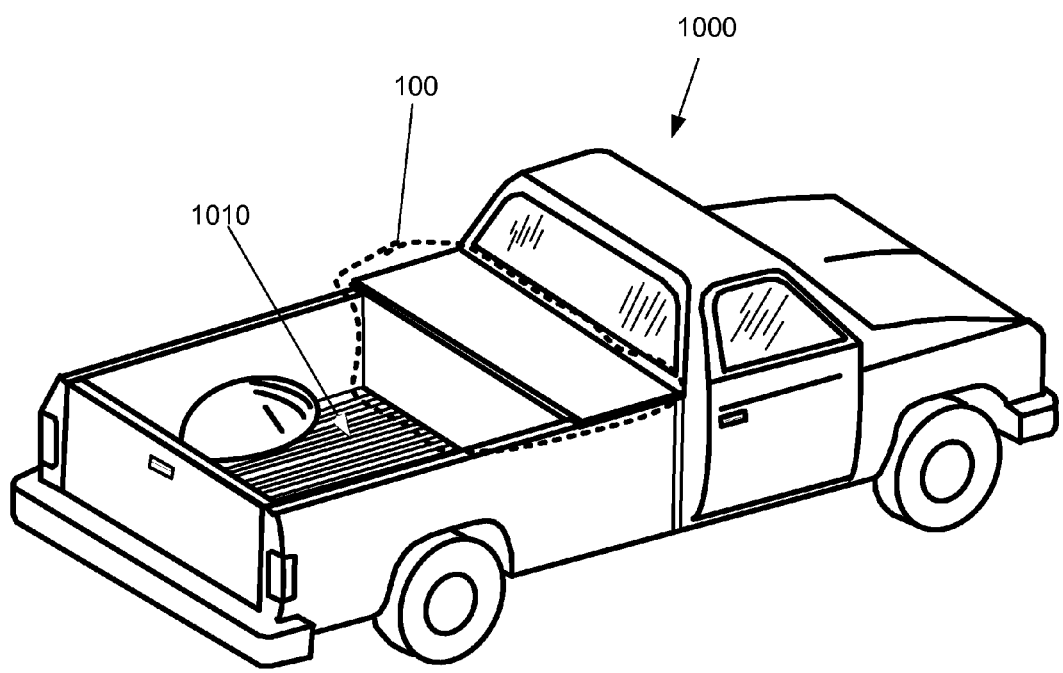
FIG. 10 is a perspective view of a truck with a preferred embodiment of the toolbox installed on an exemplary truck bed.

As shown in FIG. 1, FIG. 3 and FIG. 10, a toolbox (100) for a truck bed (1010) includes a box (105), a plurality of extension walls (110); a cover (115); and a plurality of extensible guide rails (305). The plurality of extensible guide rails (305) is within the dashed circles in FIG. 3 and an extensible guide rail (505) is shown in isolation in FIG. 5. While the truck (1000) depicted in FIG. 10 is a pick-up truck shown as an example, the toolbox (100) has application to flatbed trucks and other trucks and applications.

Figure 7:
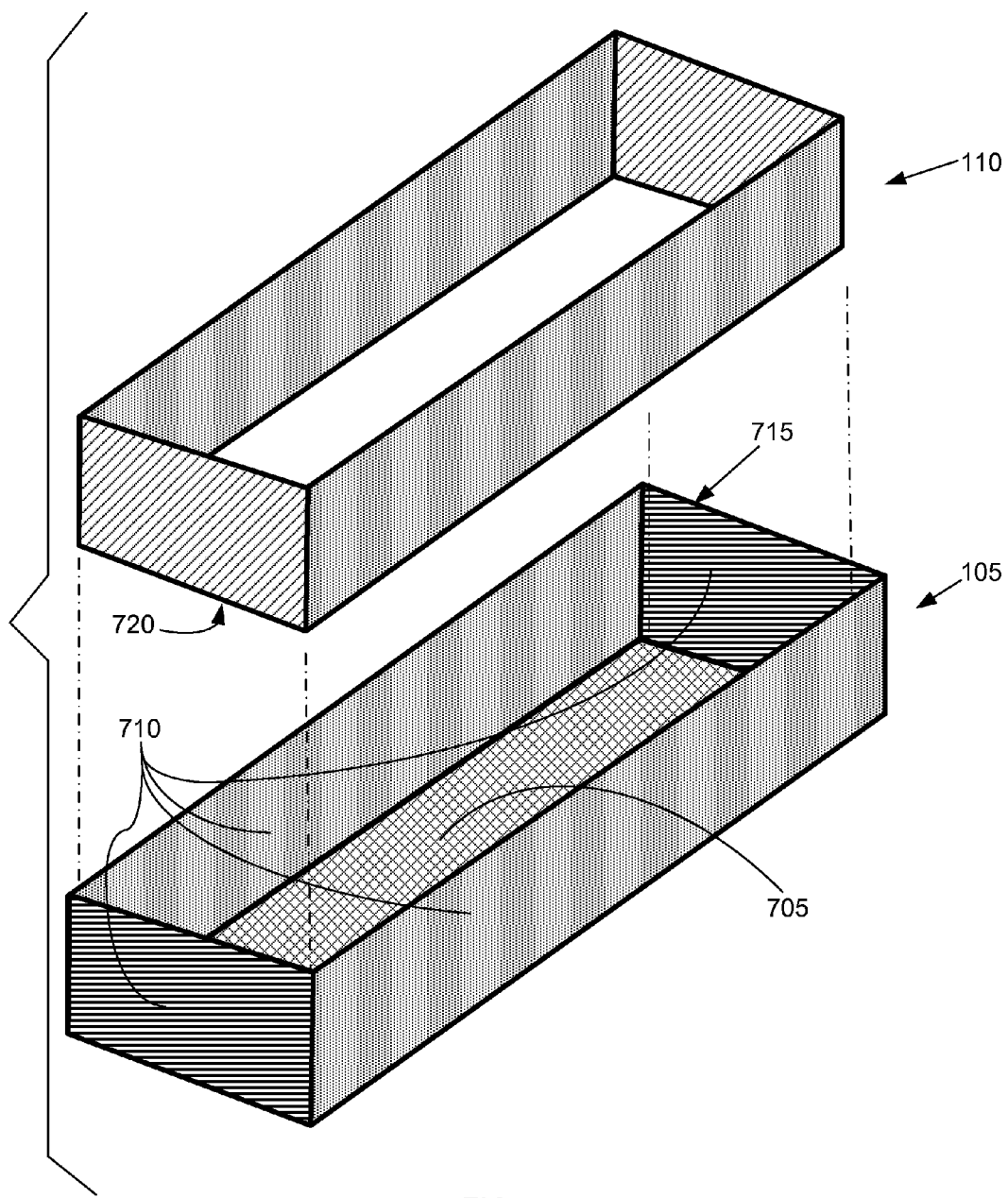
FIG. 7 is an exploded perspective view of the box below the extension walls.

Preferably, the box (105) has five walls that include a floor (705), shown in FIG. 7, and four side-walls (710). The five walls are preferably configured to define a square or rectangular cross-section of the box (105). The box (105) could be made with additional vertical walls when the cross-section is other than of a square or rectangle. The four side-walls (710) rise vertically from the floor (705). It is preferable that the vertical rise be perpendicular to the plane of the floor (705), but may be other than perpendicular to suit particular applications. The four side-walls (710) of the box (105) define an open top-end (715). The box (105) defines a storage volume over its internal length, width and height that would typically be used for storing tools.

The plurality of extension walls (110) fit within the box (105). Preferably, there are a sufficient number of extension walls in the plurality of extension walls (110) so that each extension wall parallels each of the side-walls of the box (105). Thus, it is preferable that when the box (105) has four side-walls, then the plurality of extension walls (110) would be four extension walls having the same configuration as the vertical walls of the box (105). In that embodiment where the box (105) has four side-walls, then preferably each extension wall in the plurality of extension walls (110) is joined together so as to be adjacent to one of the four side-walls (710) of the box (105).

Figure 8:
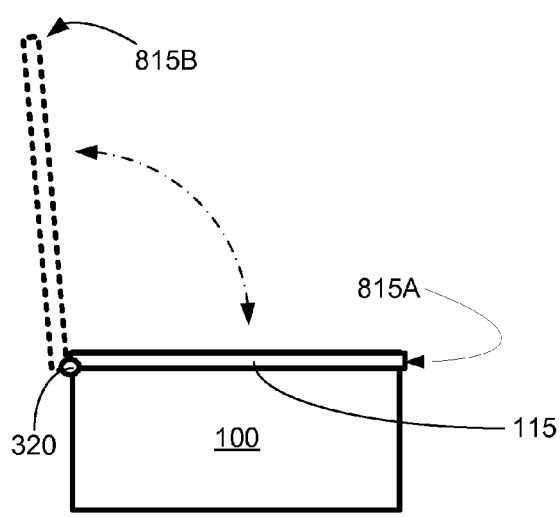
FIG. 8 is a side elevation view of the toolbox showing the cover in a closed position and a dashed representation of it rotated to the open position.
Figure 9:
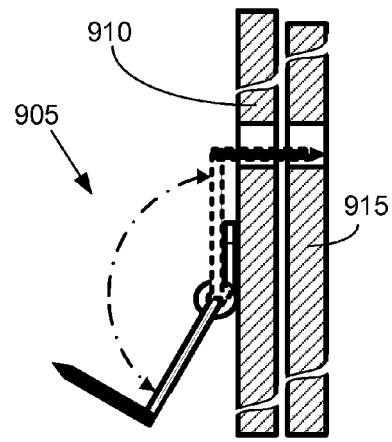
FIG. 9 is a sectional view of a portion of the toolbox showing a locking hinged pin in context attached to an extension wall and showing a pre-deployed position in solid lines and rotation to a deployed position in dashed lines.

The cover (115) is affixed by a hinge (320) to the top the extension walls (110) at one side, preferably on the side comprising a longer dimension of the toolbox (100). Thus, the cover (115) is hingedly attached to one of the extension walls (110) so as to rotate between a closed position (815A) and an open position (815B), as shown in FIG. 8. When the cover (115) is in the closed position (815A), the cover (115) prevents access to the box (105), and when in the open position (815B) there is access to the storage volume.

The toolbox (100) includes the plurality of extensible guide rails (305), as shown in FIG. 3. There is preferably at least two extensible guide rails located opposite each other in the box (105). While there are many drawer-type extension slides that may be used as extensible guide rails, it is preferable to have a simple low cost mechanism.

Figure 5:
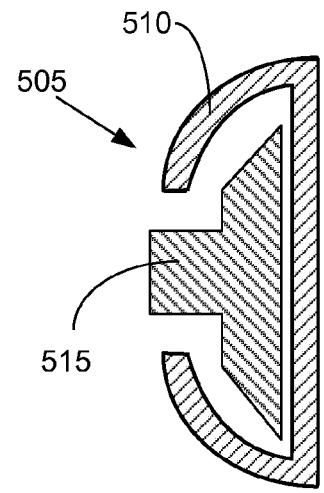
FIG. 5 is a side sectional view of a preferred embodiment of an extensible guide rail.

Each extensible guide rail (505), as shown in FIG. 5, includes a fixed part (510) and a sliding part (515). The fixed part (510) of each extensible guide rail (505) in the plurality of extensible guide rails (305) is mounted vertically in a fixed position on substantially opposing side-walls of the box (105). For the embodiment with just four side-walls (710) of the box (105), the fixed part (510) is mounted on opposite sides of the box (105).

The sliding part (515) of each extensible guide rail (505) in the plurality of extensible guide rails (305) is attached to the extension wall in the plurality of extension walls (110) that is adjacent to the extensible guide rail (505) so that it can move, that is slide up and down, within the fixed part (510). Thus, a bottom (720) of one extension wall in the plurality of extension walls (110) can be moved vertically from a lowered position (125) to an elevated position (205) within the box (105). For preferred embodiments, the plurality of extension walls (110) are evenly aligned along the bottom (720) and so all are movable to the same elevated position (205). It is possible in some embodiments, however, that the one or more extension wall will be taller than another in the plurality of extension walls (110). Thus at least the bottom (720) of one extension wall in the plurality of extension walls (205) is movable to the elevated position. A stopping block (315) may be added to limit the upward movement of the plurality of extension walls (110). For example, the stopping block (315) may be placed in the path of the spring-actuated detent (120) so as to engage an engagement surface (405) on the spring-actuated detent (120) thereby preventing upward movement beyond the stopping block (315).

The toolbox (100) may have a locking hinged pin (905) that secures the plurality of extension walls (110) in position, preferably at least in the elevated position (205). Preferably, there are two or more such locking hinged pins on opposing sides of the toolbox (100), mounted to the interior surface of an extension wall (910) in the plurality of extension walls (110). Preferably, the locking hinged pin (905) is manually rotated into position when a desired elevation is achieved so that it engages into a receiving hole in a side wall (915) of the box (105).

Alternatively, the toolbox (100) may have a spring-actuated detent (120) that secures the plurality of extension walls (110) in position, preferably at least in the elevated position (205). Preferably there are two or more such spring-actuated detents on opposing sides of the toolbox (100), mounted to the interior surface of an extension wall (910) in the plurality of extension walls (110). Preferably, a spring in the spring-actuated detent (120) biases the spring-actuated detent (120) to automatically engage into a receiving hole in a side wall (915) of the box (105) when the spring-actuated detent (120) is moved to a position aligning with the receiving hole so that once engaged, the plurality of extension walls (110) remains in position until the spring-actuated detent (120) is disengaged from the receiving hole.

Figure 6:
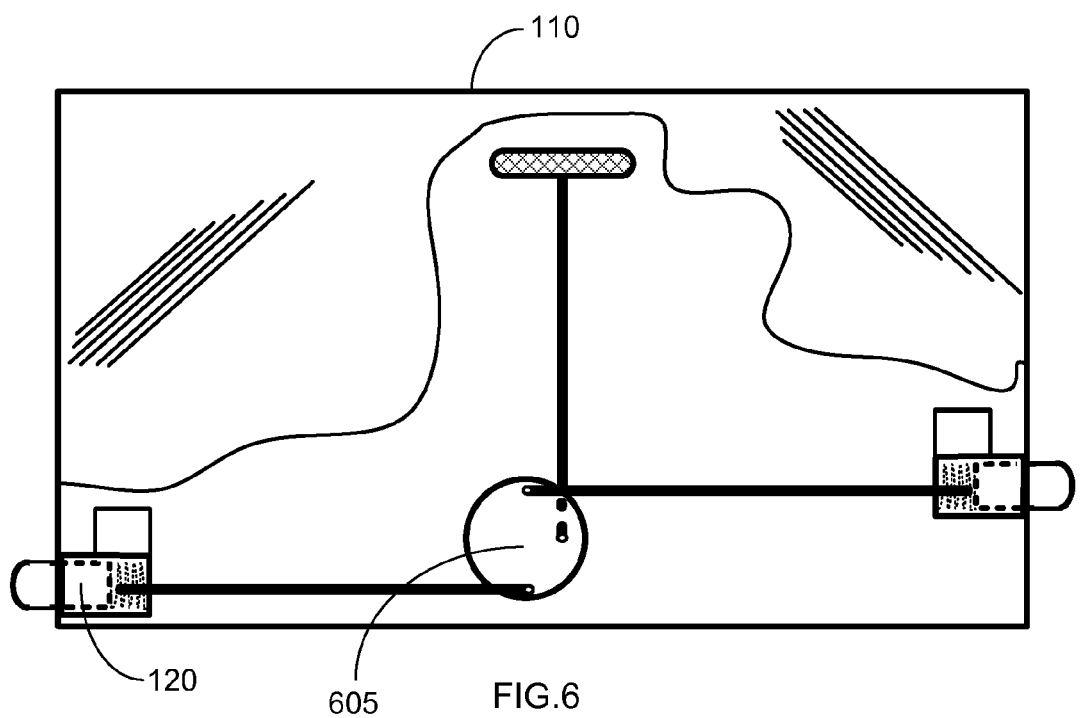
FIG. 6 is a cut-away of extension walls showing a preferred means for disengaging the spring-actuated detents in order to lower the extension walls to a stored position from a fully extended position.

The spring-actuated detent (120) may also be used to secure the plurality of extension walls (110) in the lowered position (125). The spring-actuated detent (120) may be individually hand released or released using an electrical switch. Alternatively, each spring-actuated detent (120) within the toolbox (100) may be interconnected so as to be released either manually with a detent release mechanism (605), as shown in FIG. 6, or automatically when an electric motor is activated.

The toolbox (100) may include a lift support (210) that biases the position of the plurality of extension walls (110) to the elevated position (205). Many such devices are known in the art and commonly used to assist in lifting and holding a hood or trunk lid in an automobile. The lift support (210) may be a simple spring or a more complex mechanism such as a gas charged lift support found in automobile applications.

The toolbox (100) may include a handle (310) mounted to one of the extension walls (110) in the plurality of extension walls (110) so as to be accessible when the cover (115) is in the open position (815B). The handle (310) permits manually lifting and lowering the plurality of extension walls (110). Multiple handles may be used as desired to increase the convenience of the operator in lifting and lowering the plurality of extension walls (110).

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the container industry.

What is claimed is:

1. A toolbox system comprising a pickup truck, the pickup truck comprising a truck bed and two truck side walls, the tool box system further comprising a tool box installed on the truck bed, the toolbox comprising:
    a box comprising five walls, the five walls comprising a floor and four side-walls rising vertically from the floor, the four side-walls defining an open top-end and the box defining a storage volume;
    a plurality of extension walls fitting within the box, each extension wall in the plurality of extension walls is joined together so as to be located adjacent to one of the four side-walls of the box;
    a spring-actuated detent for each of two of the extension walls in the plurality of extension walls, each spring-actuated detent mounted to an interior surface of one extension wall in the plurality of extension walls, each spring-actuated detent configured to automatically engage into a hole defined in one of the four side-walls of the box when the extension walls are in the lowered position, and each spring-actuated detent interconnected with the other and configured to be released simultaneously;
    a cover atop the extension walls, the cover hingedly attached to one of the extension walls so as to rotate between a closed position and an open position, when in the closed position the cover prevents access to the box, when in the open position there is access to the storage volume, and when the extension walls are in a lower position and the cover is in the closed position, the cover extends beyond the box and over the truck side walls; and
    a plurality of extensible guide rails, each extensible guide rail in the plurality of extensible guide rails comprises a fixed part and a sliding part,
    wherein the fixed part of each extensible guide rail in the plurality of extensible guide rails is mounted vertically in a fixed position on substantially opposing side-walls of the four side-walls of the box;
    wherein the sliding part is attached to the extension wall that is adjacent to the extensible guide rail so that a bottom of at least one extension wall in the plurality of extension walls can be moved vertically from the lowered position to an elevated position within the box.

2. The toolbox of claim 1, further comprising a plurality of locking hinged pins that may be swiveled in place, each locking hinged pin in the plurality of locking hinged pins passing through one extension wall in the plurality of extension walls and through one of the four side-walls of the box that is adjacent to that one extension wall.

3. The toolbox of claim 1, further comprising a lift support that biases the position of the plurality of extension walls to the elevated position.

4. The toolbox of claim 1, further comprising a handle mounted to one of the extension walls in the plurality of extension walls so as to be accessible when the extension walls are in the lowered position and when the cover is in the open position and configured to permit manually lifting and lowering the plurality of extension walls.

* * * * *